Figure 1:
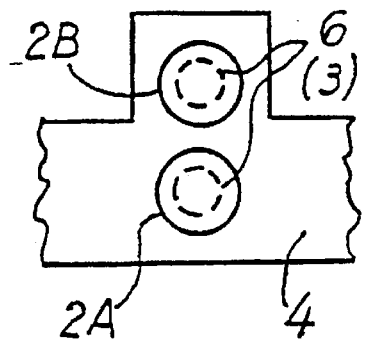

United States Patent [19]
Passoni

[11] Patent Number: 5,636,031
[45] Date of Patent: Jun. 3, 1997

[54] METHOD AND ASSEMBLY FOR MEASURING AN ARTICLE'S DIMENSIONS

[76] Inventor: Gianfranco Passoni, Melley 10, CH - 172, Grolley, Switzerland

[21] Appl. No.: 397,271

[22] PCT Filed: Jul. 20, 1994

[86] PCT No.: PCT/CH94/00151

§ 371 Date: Mar. 15, 1995

§ 102(e) Date: Mar. 15, 1995

[87] PCT Pub. No.: WO95/03525

PCT Pub. Date: Feb. 2, 1995

[30] Foreign Application Priority Data

Jul. 22, 1993 [CH] Switzerland ............... 2210/93

[51] Int. Cl.⁶ .................................... G01B 11/02
[52] U.S. Cl. ................ 356/394; 348/130; 348/132
[58] Field of Search .............. 356/394, 237; 348/86, 125, 129, 130, 132; 382/141, 152

[56] References Cited

U.S. PATENT DOCUMENTS

| | | | |
|---|---|---|---|
| 4,711,579 | 12/1987 | Wilkinson | 356/394 |
| 4,918,627 | 4/1990 | Garcia et al. | 382/152 |
| 5,184,217 | 2/1993 | Doering. | |
| 5,231,675 | 7/1993 | Sarr et al. | 382/152 |

FOREIGN PATENT DOCUMENTS

| | | |
|---|---|---|
| 0 094 522 | 11/1983 | European Pat. Off.. |
| 0 324 561 | 7/1989 | European Pat. Off.. |
| 2 304 893 | 10/1976 | France. |

OTHER PUBLICATIONS

TM Technisches Messen, vol. 57, No. 2, Feb. 1993, Munchen, DE pp. 71–77, T. Pfeifer, F.–J. Czuka 'Messsystem zur 100%–Kontrolle von Stanzteilen im Produktionstakt' see p. 73, paragraph 3—p. 77, paragraph 5; figures 3,4.

*Primary Examiner*—F. L. Evans
*Attorney, Agent, or Firm*—Davis and Bujold

[57] ABSTRACT

The object of the invention is to provide a solution to improve the accuracy of surface and/or profile measurements without any time-consuming manipulations for placing and orienting the object on a measurement table. In addition, this assembly aims at overcoming the drawbacks of known designs. The assembly consists of a stationary, horizontal transparent table (1) for supporting the objects to be measured, at least a video camera (2) and a light source (3) mounted one above the other underneath the table (1), on a bridge (4) movable on two slides (5) for moving the video camera (2) and/or the light source (3).

8 Claims, 1 Drawing Sheet

METHOD AND ASSEMBLY FOR MEASURING AN ARTICLE'S DIMENSIONS

This invention concerns an assembly and a method to measure the dimensions of an object.

In traditional optical measuring machines, the camera is equipped with a lens and a CCD sensor allowing an electronic analysis of the object's outlines, so asking for the object to be moved under the camera's lens; and risking to move the object on the support, due to vibrations induced by the support's moving mechanisms. Moreover, it is well known that lenses give distorted images; and because of that, measuring machines-cannot work with enough accuracy. All optical lenses show a chromatic aberration, which results in that the focal plane and the dimensions of the image change with a light wavelength variation. Until now, it has been tried to minimise these effects by correcting of the lenses. Nevertheless, even using corrected lenses it is possible to notice a residual chromatic aberration, which has a bad impact on the image quality and lowering the measurements accuracy.

This invention wants to supply a solution to improve the measurement accuracy, as well as to overcome the disadvantages of known realisations.

According to this invention, this aim is reached by means of a method, whose characteristics are the following:

a) one or more objects to be measured are put on a stationary measurement table,
 b) the object is exposed to light,
 c) the shape of the object is recognised taking an electronic snapshot of it by means of a video camera so that to compare the obtained shape with other ones stored into a computer and to choose the stored image having the same shape,
 d) the main axes of the object and their direction are then calculated to determine a coordinates system related to the position of the object,
 e) the outline and/or the surface of the object are then examined by means of a probe, whose displacement is driven by the stored image, having previously turned the main axes according to the direction of the ones of the object on the table, the differences between the stored image and the one made of the points detected by the probe are then determined.

The assembly to make use of the method is characterized by a stationary horizontal transparent table for supporting the objects to be measured with at least a video camera and a light source, one of them being placed over and the other one under the said table, mounted on a bridge movable on two slides, for moving the camera and/or the light source.

Figure 2:
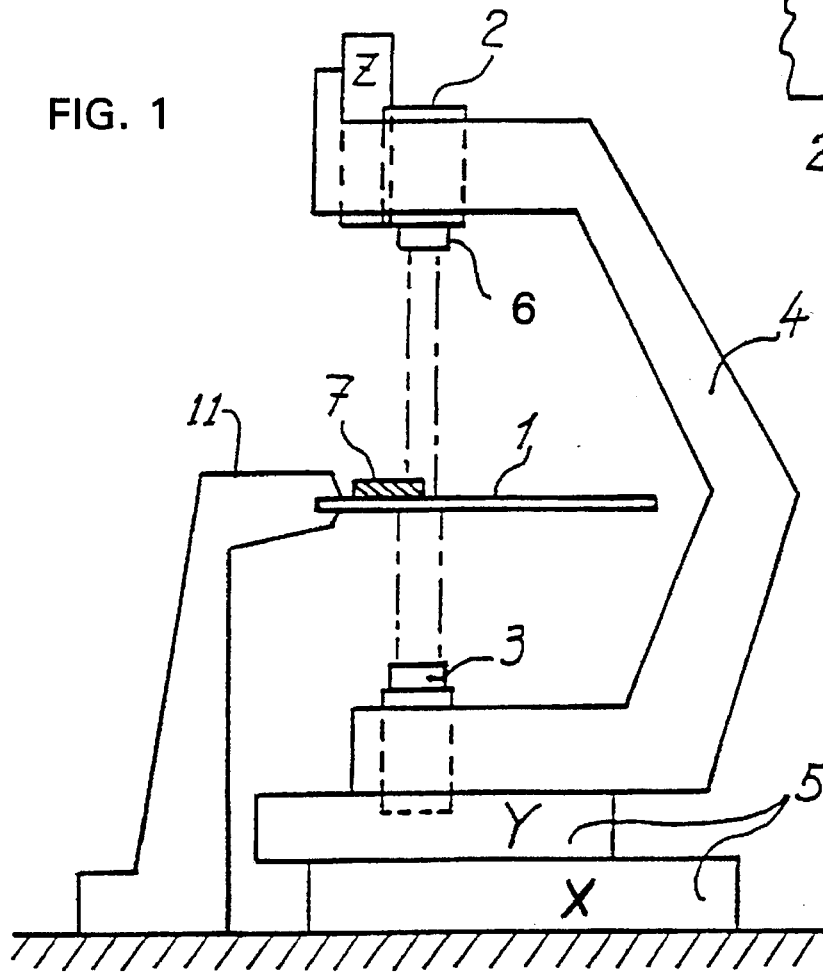
Figure 3:
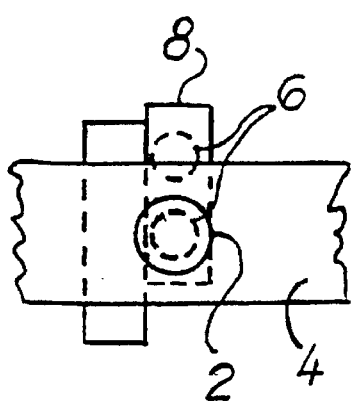
Figure 4:
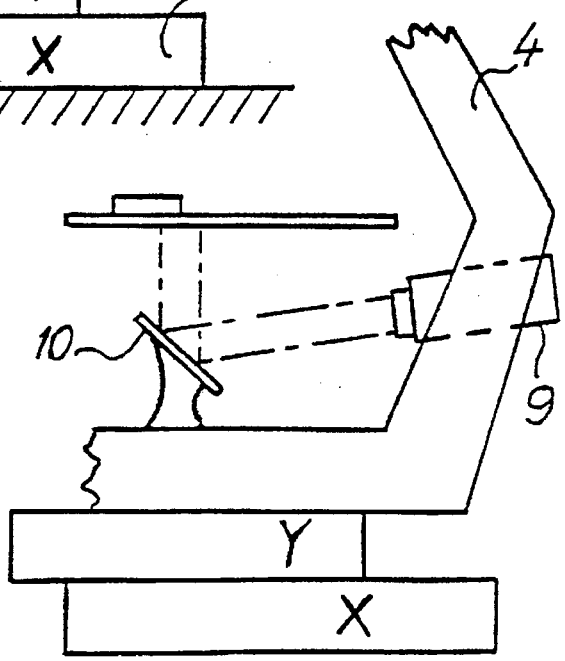

The annexed drawings show, as an example, the proposed assembly:

FIG. 1 is a global view of the invention, showing only the characteristic elements, FIG. 2 is a view from above of the bridge supporting two cameras, FIG. 3 is the same view as of FIG. 2, but with one camera and two lenses, and FIG. 4 is a partial view of the assembly showing another position for the light source.

FIG. 1 shows the assembly with a transparent support 1, fixed on a bearing arm 11 and holding some objects to be measured 7, one of which is visible on the drawing. A video camera 2 and a light source 3 are fixed on a bridge 4. The camera 2 is placed over the support 1, while the light source is placed under it. Of course, it would be possible as well to exchange the position between the camera 2 and the light source 3. The bridge 4 is mounted movable on two slides 5 X and Y, the control axes of which are not showed.

The camera 2, equipped with a lens and a CCD sensor 6 with a narrow field of view can be freely displaced up and down with respect to the support 1, on which one or more objects to be measured 7 can be placed in an undetermined position.

So as to facilitate the interpretation of the measurements, the bridge 4 can be provided with two cameras 2A and 2B as in FIG. 2. The first camera 2A could have a large field of view allowing to electronically store the position of the object(s) to be measured, as well as their angular displacement. The second camera 2B with a narrow field of view can be automatically moved from one object to another and proceed to the required measurement analyses.

A single camera 2 with two lenses 6, one of them having a large field of view while the other one has a narrow field of view are showed in FIG. 3. The lenses are mounted on a transversal slide 8 placed on the bridge 4. According to the different measurement tasks, one of the two different field of view will be used.

FIG. 4 shows another arrangement of the light source 9, which is horizontally or obliquely mounted but by side of the optical axis of the camera(s) 2A and 2B. A mirror 10 is used to have the light beam falling into the optical axis of the camera.

The aberration problem can be eliminated by filtering the light source so as to obtain a narrow band-filtered, so resulting in a nearly monochromatic light. The central frequency has to be of course chosen according to the characteristics of the lens. In practice, the light spectrum has to be chosen in a range falling around a frequency where the lens has the maximum value of chromatic aberration. Moreover, the lens is equipped with a filter having the same optical characteristics as the light source.

The reasons for the choice of the described frequency are the following:

It is not important to reduce the absolute value of chromatic aberration, but it is necessary to having it remaining constant over the whole used light spectrum. This condition is best approached at a frequency around which the lens has the maximum value of aberration, and at which the first-order derivative of the curve describing this aberration is near to zero. The residual aberration can be easily compensated by means of a calibration of the system, so granting for the minimisation of the error over the whole spectrum of the used light source.

Another problem comes out when the machine uses moving means to explore different parts of the object to be measured, due to induced vibrations. This problem is still more important if an optical system with a large magnification ratio is used to achieve a better resolution.

As the largest vibrations occur during accelerations and decelerations, the problem lies in this phase. The need for accelerations and decelerations arise from the fact that constant emission light sources are used with integrating cameras, and so it is necessary to stop the camera, as it reaches the required position to obtain a sharp image.

To avoid theses problems the present invention proposes a constant movement of the camera and a pulsed light source. With this solution, disadvantages in connection with accelerations are eliminated.

Usually, it is necessary to "tell" the machine what kind of object it has to measure and this is accomplished by means of a single identification code, permitting to the machine to load the program relating to the memorised object. Nevertheless, this method shows two disadvantages. First of all, a manual intervention is required, with consequent slow-down of the process. Secondly, it is necessary for different objects of the same shape to be placed always in the same position and with the same orientation, because the machine is usually programmed with an absolute coordinates system and not with an object-related one; moreover, fixing elements used to keep the object in place cause another slow-down of the process.

On the contrary, the invention proposes a computer program related to objects to be measured and a coordinates system related to the objects. So, the operator or a manipulator put the object on the support 1 regardless of its position. The large field view camera takes an electronic snapshot of the object, the computer chooses the correspondent program and computes position and orientation of the object. Then, the computer loads the related measurement program and automatically computes the coordinates related to the position and orientation of the object.

After having recognised the object, its position and its direction, the computer starts the measurement session. Following the programmed outline, recomputed according to the object position and direction, the computer orders the light source to give light pulses at the correct measurement positions.

With this method it is obviously possible to recognise more than one object shape and the measurement session is not restricted to only one type of objects at a time, as the objects can arrive as the automatic machines deliver them. Moreover, the measurement can be carried on at a high speed, as manual intervention that could slow down the process is not required.

I claim:

1. A method for measuring dimensions of an object, said method comprising the steps of:

placing the object to be measured on a stationary measurement table (1);

exposing at least one surface of the object to light supplied by a light source;

detecting an electronic image snapshot of the object, from a surface opposite the surface illuminated by the light source, by means of a first video camera (2) having a first lens with a first field of view;

automatically comparing the electronic image snapshot of the object with image information stored in a computer;

determining a position and an orientation of the object to be measured;

displacing a probe according to a displacement determined by the stored image information and the determined position and orientation of the object;

switching on the light source for only a short duration of light pulses;

detecting a further image of the object to be measured by means of the probe; and measuring any differences between the stored image information and the image information detected by the probe.

2. A method according to claim 1, further comprising the steps of utilizing said first video camera with a second lens, which has with a second field of view which is relatively narrower than the field of view of said first lens, as said probe.

3. A method according to claim 1, further comprising the step of utilizing a second video camera, which is different from the first video camera, as said probe.

4. A method according to claim 1, further comprising the step of following an outline of the object (7), via the first video camera (2), without stopping.

5. A method according to claim 1, further comprising the step of driving the first video camera (2) only according to points determined from the stored image information.

6. A method according to claim 5, further comprising the step of driving the light source by said points determined from the stored image information to provide said short-duration of light pulses.

7. A method according to claim 5, further comprising the step of utilizing a monochromatic light source, which supplies a monochromatic light beam, as said light source.

8. A measurement assembly apparatus comprising a stationary horizontal transparent table (1) for supporting an object to be measured, at least one light source (3) being placed on one side of the table (1), first and second video cameras (2A, 2B) being mounted on an opposite side of the table with respect to the light source (3), a first lens, having a relatively larger field of view, being associated with said first video camera (2A) and a second lens, having a relatively narrower field of view to allow high resolution measurements, being associated with said second video camera (2B), the first and second video cameras and the light source being mounted on a bridge (4) movable on two slides (5), for moving the first and second video cameras (2) and the light source (3), said measurement assembly apparatus being used in combination with a method comprising the steps of:

placing the object to be measured on a stationary measurement table (1);

exposing at least one surface of the object to light supplied by said light source;

detecting an electronic image snapshot of the object, from a surface opposite the surface illuminated by the light source, by means of said first video camera (2);

automatically comparing the electronic image snapshot of the object with image information stored in a computer;

determining a position and an orientation of the object to be measured;

displacing a probe according to a displacement determined by the stored image information and the determined position and orientation of the object;

switching on the light source for only a short duration of light pulses;

detecting a further image of the object to be measured by means of the probe; and measuring any differences between the stored image information and the image information detected by the probe.

* * * * *